United States Patent [19]

Udengaard et al.

[11] 4,049,403
[45] Sept. 20, 1977

[54] DEVICE FOR SUSPENSION OF AIR FILTER BAGS

[75] Inventors: Poul Werner Udengaard, Hellerup; Orla Mosevang; Finn Erling Thomsen, both of Hjallerup; Erik Paul Eklund, Kongerslev, all of Denmark

[73] Assignee: H. Moldow A/S, Bagsvaerd, Denmark

[21] Appl. No.: 673,048

[22] Filed: Apr. 2, 1976

[30] Foreign Application Priority Data

Apr. 4, 1975 Denmark .................. 1440/75

[51] Int. Cl.² .................. B01D 46/02
[52] U.S. Cl. .................. 55/378; 285/320
[58] Field of Search .............. 248/317, 327; 85/32 V; 285/320; 55/378, 379

[56] References Cited

U.S. PATENT DOCUMENTS

| 2,191,579 | 2/1940 | Nelson | 285/320 |
| 3,385,036 | 5/1968 | Webb | 55/DIG. 29 |
| 3,881,673 | 5/1975 | Peterson | 248/327 |

Primary Examiner—Bernard Nozick
Attorney, Agent, or Firm—Finnegan, Henderson, Farabow & Garrett

[57] ABSTRACT

A socket attached to a support and a screw which is attached to a filter bag within a socket. A pivot attached to the socket and supporting a locking member having teeth which engages threads of screw through opening in socket.

6 Claims, 3 Drawing Figures

DEVICE FOR SUSPENSION OF AIR FILTER BAGS

In air filtration plants of the type especially used in premises with wood-working machines the waste, in the form of sawdust and shavings, is drawn in an air stream from the individual machines up into a common duct from which the air can escape through a plurality of filter bags suspended above the duct, and the lower end of which is in communication interior the intrerior of the duct through pipe stubs on top of the duct. The bags are usually suspended by means of bolts secured by nuts partly to the upwardly faced bag bottoms and partly to an overlying supporting beam. As the bags are generally made from hygroscopic filter material they will expand and contract in response to variations in the humidity of the air, and their length may vary as much as 50 mm. This fact necessitates use of long bolts and may complicate and protract the fitting operation.

This invention relates to a device for suspending filter bags in air filtration plants and the object thereof is to provide such a device as will facilitate fitting and removal of the bags.

This object is achieved by the device according to the invention which comprises a screw for attachment to the bag end and a socket for attachment to a supporting member, into which socket the screw can be inserted and is releasably retained by means of a toothed segment pivotally mounted on the socket and yieldingly urged to engage with the thread so that it permits inward movement of the screw but prevents outward movement thereof. The entire operation of suspending a filter bag by means of such a device consists in inserting the screw into the socket and release same when it has reached an insertion depth suitable for the subject bag, after which it is automatically retained in this position by the toothed segment engaging the thread of the screw.

In an embodiment of the device according to the invention the toothed segment is connected to a lever so that the weight of the latter will urge the toothed segment to engage with the thread. Thus in this arrangement the required urging of the toothed segment is produced by gravitation, and the screw and with that the bag may be released by a light turn of the lever.

The device according to the invention may be provided with a stop means for limiting movement of the toothed segment in the direction in which the latter is yieldingly urged. Said stop means makes it possible to ensure such a position of rest of the toothed segment that there will be no difficulties in inserting a screw into the socket.

The invention will be further explained below with reference to the drawings, in which FIG. 1 is a lateral and partly sectional view of an embodiment of the device according to the invention.

FIG. 3 is a section taken along the line III—III of FIG. 2.

Figure 1:
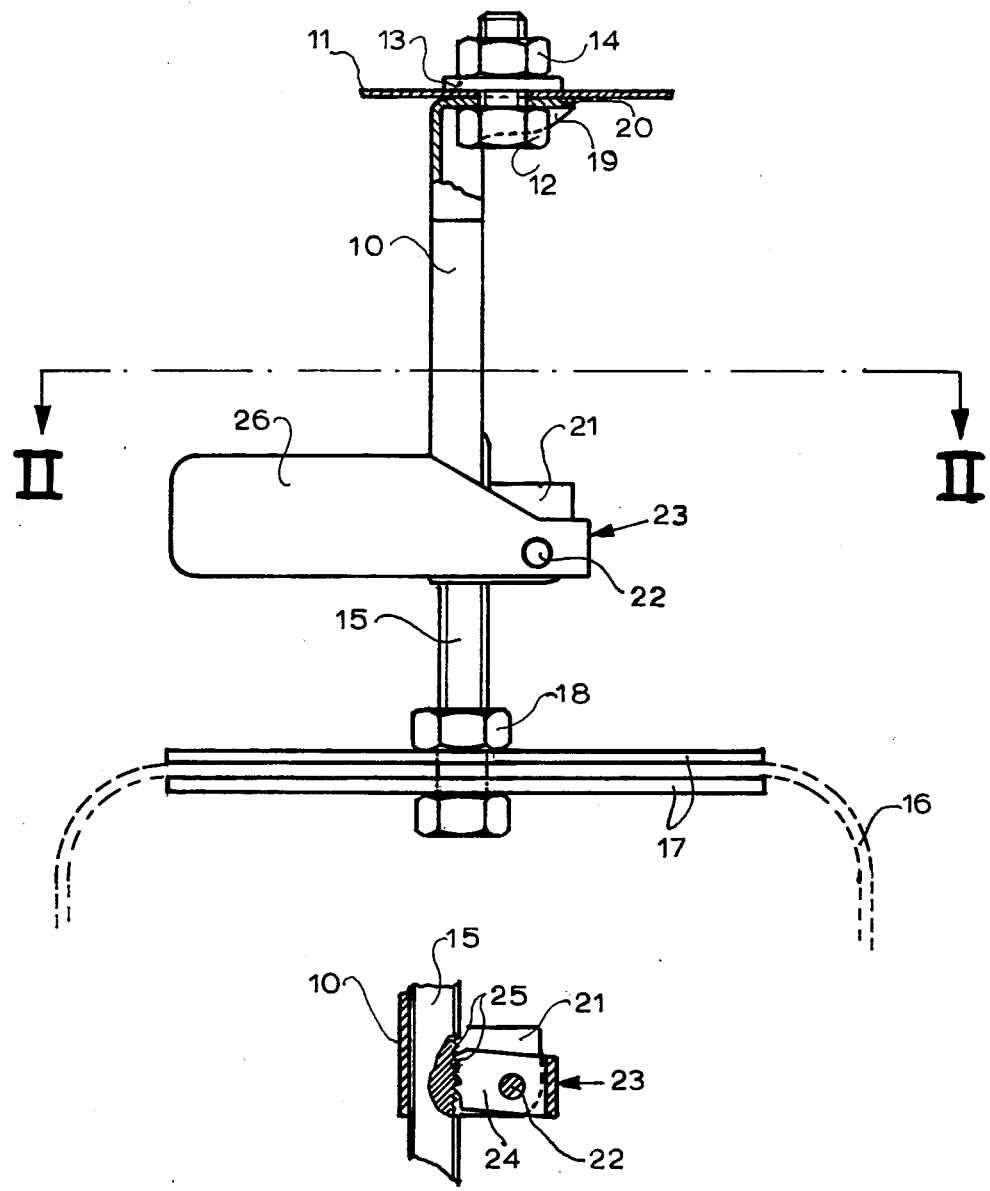
Figure 2:
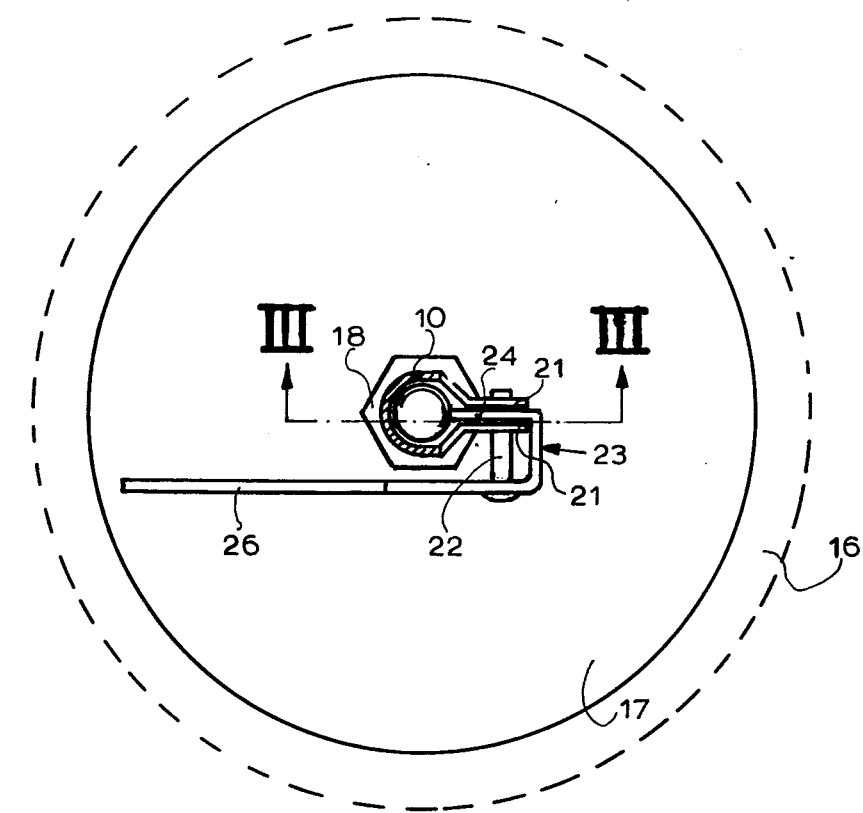
FIG. 2 is a section taken along the line II—II of FIG. 1.

The suspension device illustrated in the drawings comprises a socket 10 secured to an overlying supporting member 11 by means of a screw 12 with associated washer 13 and nut 14, and a screw 15 extending through and secured to the upwardly faced bottom of a filter bag 16, shown by dotted lines, by means of two washers 17 and a nut 18. The socket 10 forms a vertical substantially U-shaped channel, as will appear from FIG. 2, having at the top a folded end portion 20 braced by side flanges 19 and through which the fastening screw 12 is carried. The lower portion of the socket 10 includes two laterally projecting lobes 21 supporting a pivot 22 for a locking element 23 consisting of a bent plate of L-shape. The short leg 24 of the locking element disposed between the two lobes 21 constitutes a segment formed with teeth 25 which in the shown position of the locking element engages the thread of the screw 15, as more clearly shown in FIG. 3. The point of engagement is so positioned in relation to the pivot 22 that it cannot pass down past this pivot and that a downward pull of the screw 15 will cause the toothed segment 24 to urge the screw 15 against the bottom of the channel formed by the socket 10. The long leg of the locking element 23 constitutes an operating lever 26 whose weight maintains the toothed segment in a position of engagement. A slight clockwise turn of the lever 26, FIG. 1, however, will disengage the toothed segment from the screw 15 which will then be released and drop down. When the lever 26 is released after the screw 15 dropping out, impact of the base of the L-shaped locking element 23 against the leading edge of one loge 21 will stop the locking element in such substantially horizontal position that the screw 15 may without difficulty be inserted into the socket from below.

During this insertion the locking element will perform oscillations as the teeth 25 alternately engage the thread and are lifted away from engagement with the thread cams.

The structural details of the device according to the invention may depart from those illustrated and described above. The socket 10, for example, could be a closed tube with a slot for receiving the toothed segment, and the latter might be influenced by a spring for engagement with the thread.

What we claim is:

1. A device for suspending a filter bag in an air filtration plant, comprising:
   an elongated screw for attachment to the bag end,
   a socket receiving said screw and having means adapted to be attached to and dependent from a supporting member,
   a segment pivotally carried by said socket and having a plurality of teeth engageable with the threads of said screw, said segment being received through an opening in said socket, and
   means carried by said socket for yieldingly biasing said segment for movement of its teeth through the opening into engagement with said screw thread enabling axial movement of said screw in one direction with said segment yielding against the bias of said biasing means to the passage of said screw in said one direction and preventing movement of said screw relative to said socket in the opposite axial direction, said engagement between said screw and said teeth lying on one side of a line normal to the axis of said screw and passing through both said pivot and the axis of said screw when said segment both enables and prevents movement of said screw relative to said socket in the opposite axial directions respectively.

2. A device according to claim 1 including a stop carroed by said socket for limiting the movement of said toothed segment under the bias of said biasing means.

3. A device according to claim 1 wherein said socket comprises an elongated channel of substantially U-shaped cross section, a flange carried by said socket adjacent one end thereof, a pair of opposed lobes provided at the opposite end of said socket, and means pivotally coupling said segment to said lobes.

4. A device according to claim 1 wherein said biasing means includes a lever connected to the teeth of said segment and pivotally carried by said socket, the center of gravity of said lever lying on the side of said pivot such that the weight of said lever causes said toothed segment to engage said screw, a stop carried by said socket for limiting the movement of said toothed segment under the bias of said biasing means, said socket comprising an elongated channel of substantially U-shaped cross section, a flange carried by said socket adjacent one end thereof, a pair of opposed lobes provided at the opposite end of said socket, and means pivotally coupling said segment to said lobes.

5. A device according to claim 1 wherein said biasing means includes a lever connected to said segment and pivotally carried by said socket, the center of gravity of said lever lying on the side of said pivot such that the weight of said lever causes the teeth of said segment to engage said screw.

6. A device according to claim 5 wherein said segment and said lever constitute the short and long legs respectively of a generally L-shape plate.

* * * * *